United States Patent
Marquet et al.

(10) Patent No.: US 7,171,684 B1
(45) Date of Patent: Jan. 30, 2007

(54) DATA PROCESSING SYSTEM PROVIDING SECURE COMMUNICATION BETWEEN SOFTWARE COMPONENTS

(75) Inventors: Bertrand Marquet, Antony (FR); Guy Fouquet, Nozay (FR); Laurent Ballester, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/564,695

(22) Filed: May 4, 2000

(30) Foreign Application Priority Data

May 6, 1999 (FR) .................................. 99 05763

(51) Int. Cl.
*G06F 13/14* (2006.01)
*G06F 11/30* (2006.01)

(52) U.S. Cl. ................. 726/14; 713/150; 713/152; 713/168; 709/217; 709/223; 709/230; 726/1; 726/2; 726/12; 726/15

(58) Field of Classification Search ........... 713/150, 713/168, 152; 709/219, 217, 223, 230; 726/1, 726/2, 12, 14, 15
See application file for complete search history.

(56) References Cited

U.S. PATENT DOCUMENTS

| | | | | |
|---|---|---|---|---|
| 5,010,572 A | * | 4/1991 | Bathrick et al. | 713/162 |
| 5,586,260 A | * | 12/1996 | Hu | 726/12 |
| 5,784,566 A | * | 7/1998 | Viavant et al. | 709/229 |
| 5,899,990 A | * | 5/1999 | Maritzen et al. | 707/4 |
| 6,181,692 B1 | * | 1/2001 | DeGolia, Jr. | 370/352 |
| 6,209,101 B1 | * | 3/2001 | Mitchem et al. | 726/2 |
| 6,363,144 B1 | * | 3/2002 | Becher et al. | 379/211.01 |
| 6,636,898 B1 | * | 10/2003 | Ludovici et al. | 709/250 |

FOREIGN PATENT DOCUMENTS

| EP | 0 677 943 A2 | 10/1995 |
|---|---|---|
| EP | 0 817 444 A2 | 1/1998 |

OTHER PUBLICATIONS

K. beznosov et al., A Resource Access Decision Service for CORBA-based Distributed Systems, acsac, p. 310, 15th Annual Computer Security Applications Conference (ACSAC '99), 1999, Downloaded from the IEEE Xplore, May 24, 2006.*
Brackenbury, I. F. e tla.: "IBM's Enterprise Server for JAVA", IBM Systems Journal, US, IBM Corp. Armonk, New York, vol. 37, NR. 3, pp. 323-335, XP000783105.

* cited by examiner

*Primary Examiner*—Christopher Revak
(74) *Attorney, Agent, or Firm*—Sughrue Mion, PLLC

(57) ABSTRACT

A virtual security server enabling a set of applications to access a plurality of security services. In response to a service request from a software application, the virtual security server receive service determines which of the security servers is able to provide the requested service. The virtual security server sends to a selected security server data enabling the selected security server to provide the security service corresponding to the service request. Accordingly, communication between the applications and the security servers is simplified because the application are not required to manage negotiation protocols associated with the security servers and choose the security server(s) appropriate for the required service.

6 Claims, 2 Drawing Sheets

PRIOR ART
FIG_1
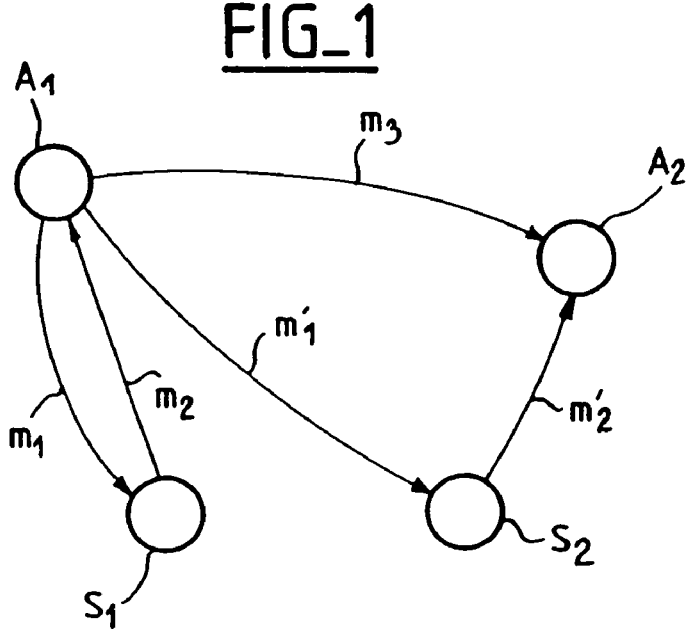
FIG_2
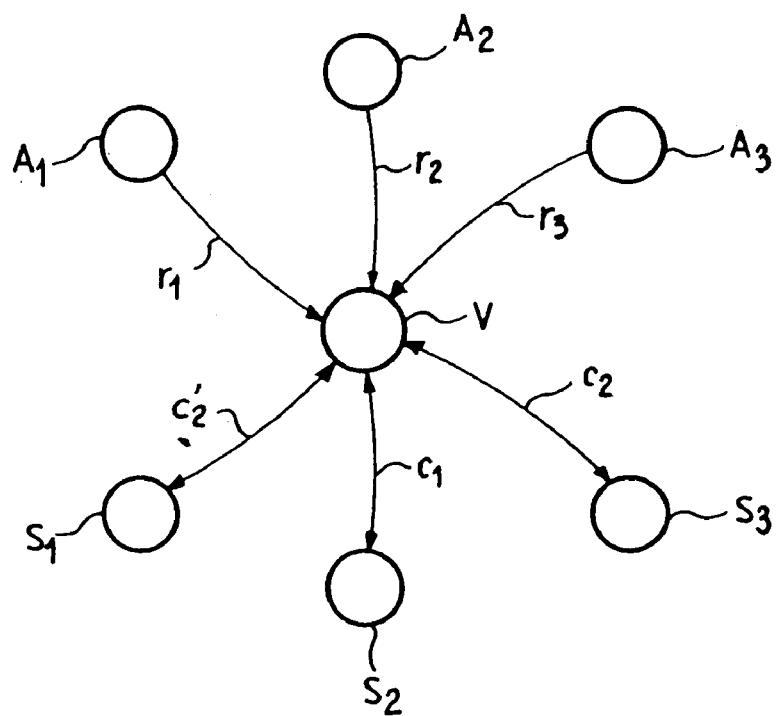

DATA PROCESSING SYSTEM PROVIDING SECURE COMMUNICATION BETWEEN SOFTWARE COMPONENTS

BACKGROUND OF THE INVENTION

The invention applies particularly well to network management systems, in particular telecommunications network management systems. This particular application is described in greater detail below, but the invention also has other applications, for example e-business applications.

Telecommunications network management systems conventionally include a set of management software applications. These applications can be distributed within a distributed system and may need to communicate with one another to exchange data.

It may be necessary for such communication to be secure. Depending on the threat and on the sensitivity of the data transmitted, various security services can be employed, for example:

Identification and authentication: this technique assures the receiver of a message that the source is authentic. This guarantees that there are no messages in the system sent by an ill-intentioned third party.

Access control: an application responds to commands contained in messages only in accordance with rules defined in a security policy. For example, an application can communicate only with a particular set of other applications.

Non-repudiation: some of the data in the messages exchanged is stored so that neither party can deny having participated in the communication.

Confidentiality: messages are encrypted so that third parties are unable to interpret the contents.

The above services, and others not referred to, are typically provided by dedicated software applications referred to as security servers. There can be more than one security server, each providing one or more security services. Likewise, each security service can be provided with different levels of quality.

FIG. 1 shows a prior art architecture that has been used in this field. An application $A_1$ requires secure communication with an application $A_2$. To this end it can use a security server $S_1$ which provides low-level cryptographic support or a security server $S_2$ which provides a high-level cryptography service.

If the application $A_1$ uses the server $S_1$, it initially sends a request-for-service message $m_1$ to the server $S_1$. The server $S_1$ returns a key in a response message $m_2$. The application $A_1$ can then send its message $m_3$ to the application $A_2$ after encrypting it using the key.

If the application $A_1$ uses the security server $S_2$; it passes to the security server $S_2$ a message $m'_1$ to be transmitted. The server $S_2$ is responsible for implementing the cryptographic techniques and sends the encrypted message $m'_2$ to the application $A_2$.

The above two examples show that different levels of service can be available for the same security service. Similarly, for the same service and the same level of service, there can be different negotiation protocols between the initiating application ($A_1$) and the security server. This applies to negotiating the encryption key in the case of a cryptographic service, for example. Examples of such protocols include the Diffie-Hellman and Needham-Schröder methods. These methods are described in "Practical Intranet Security" by Paul Ashley and Mark Vandenwauver, published in 1999 by Kluwer Academic Publishers, for example.

To summarize, an application requiring secure communication with another application must be able to use different negotiation protocols according to the service and the level of service it requires.

This also implies that if it is required to replace a security server corresponding to a given service and a given level of service with another server offering a higher quality of service, for example, but using a different negotiation protocol, the applications will have to be modified if they are not equipped for the new protocol from the outset.

What is more, the communications resources to be used to reach each security server can be different. For example, each application must be able to manage direct access, access via a software bus such as the CORBA (Common Object Request Broker Architecture) of the OMG (Open Management Group) or Microsoft's DCOM (Distributed Common Object Management) or access via-a network.

OBJECT AND SUMMARY OF THE INVENTION

The object of the present invention is to alleviate these various drawbacks. To this end, it consists in a virtual security server for enabling a set of software applications to access a set of security services. The virtual security server includes:

means for receiving service requests from the software applications, communications means for communicating with security servers providing the security services in question, and means for choosing at least one security server for each service request received and for sending thereto, via said communications means, data enabling it to provide the security service corresponding to said service request, at least some of said data being contained in said service request.

In an embodiment of the invention, the software applications can access the virtual security server via a programming interface or an API (Application Programming Interface).

In an embodiment of the invention, the virtual security server is written in a programming language such as Java.

The invention also provides a method of enabling a software application to access a security service, the method including the steps of:

a software application sending service requests to a virtual security server, the virtual security server choosing a destination security server able to provide the security service corresponding to said service request, and sending data to said destination security server so that it can provide the security service, at least some of said data being contained in the service request.

BRIEF DESCRIPTION OF THE DRAWINGS

FIG. 1, already commented on, shows a prior art architecture for secure communication between applications.

FIG. 2 shows a general architecture in accordance with the invention.

MORE DETAILED DESCRIPTION

Figure 3:
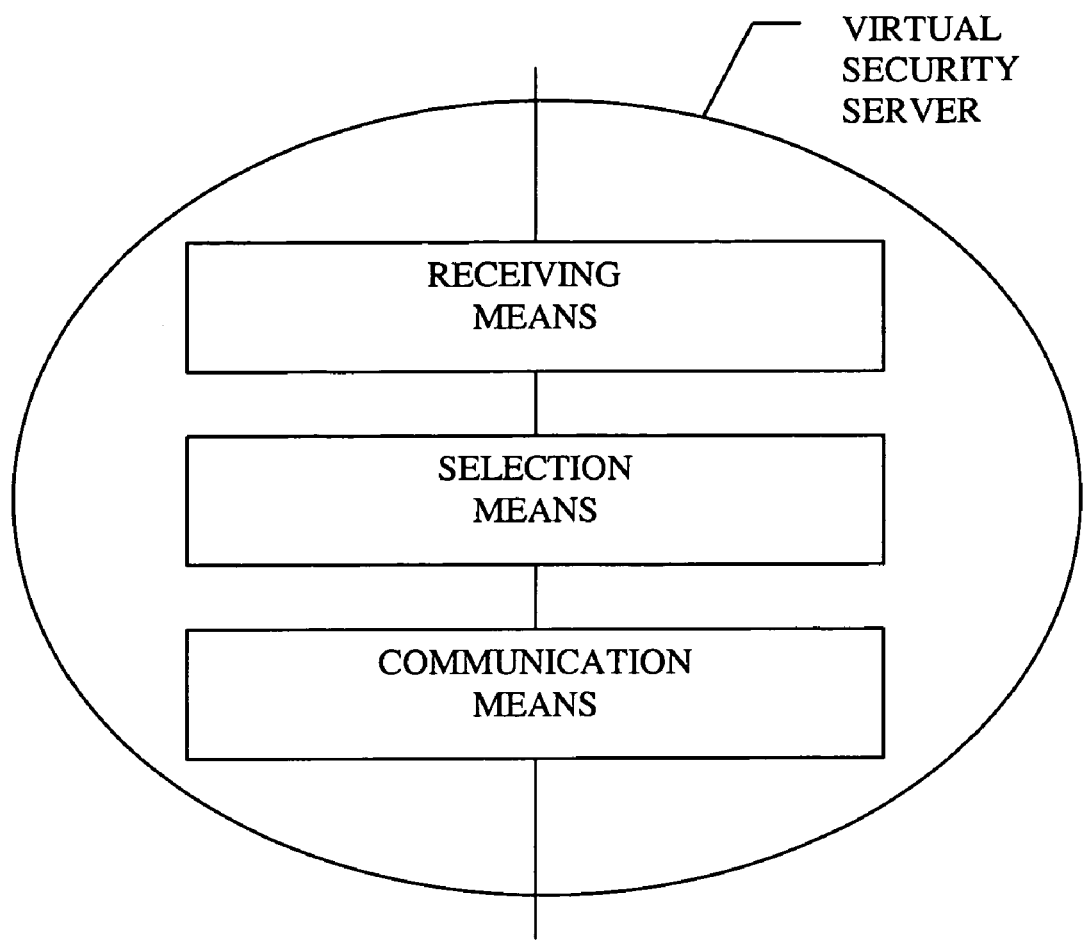
FIG. 3 shows a virtual security server in accordance with the invention.

FIG. 2 is a diagram showing an example of an architecture in accordance with the invention. Three software applications $A_1$, $A_2$ and $A_3$ can send respective service requests $r_1$, $r_2$ and $r_3$ to a virtual security server V when they require to initiate secure communication.

As shown in FIG. 3, the virtual security server includes means for receiving service requests from the software applications $A_1$, $A_2$ and $A_3$, means for communicating with security servers $S_1$, $S_2$ and $S_3$ providing the security services, and means for choosing at least one security server for each service request received and for sending it data enabling it to provide the security service corresponding to the service request.

In an embodiment of the invention the service requests contain only the type of services required (authentication, confidentiality, etc.).

The virtual security server then determines which of the available security servers-($S_1$, $S_2$ and $S_3$) are able to provide the requested service. To this end, the virtual server V can include storage means associating security services requested by applications with security servers providing them.

In the example shown in FIG. 2, the request for service r1 generates a request c1 between the virtual server V and the security server S2. That request may be made up of an exchange of messages between the two participants which depends on the security server S2 and the negotiation protocol it uses. Clearly this architecture masks the negotiation protocol in question from the application, which therefore has no need to concern itself with it.

The application $A_2$ sends the virtual security server V a service request $r_2$. The virtual server interprets the request in the same manner as previously, but this time providing the requested service necessitates two security servers $S_1$ and $S_3$, to which the virtual server initiates two requests $c_2$ and $c'_2$.

In the architecture of the invention, the applications ($A_1$, $A_2$ and $A_3$) do not need to know anything about the security servers ($S_1$, $S_2$, $S_3$). As previously mentioned, this simplifies communication between the applications because they are freed of managing the negotiation protocols and of choosing the security server(s) appropriate to the required service. This simplifies application development and therefore reduces the cost thereof.

Also, it is routine practice to add a security server to a network management system, or to replace one with another. In a prior art architecture, adding or replacing a server can lead to the applications having to take account of a new protocol, and in any event of a new server, for providing the required security services, which necessarily entails modifying all the applications concerned.

In contrast, in an architecture of the invention, only the virtual server has to be modified. Obviously modifying a single, clearly-identified software component is much less costly than modifying an entire set of heterogeneous software components.

What is more, the architecture of the invention enables the use of a plurality of security servers to provide the same security service in a manner that is totally transparent as far as the applications are concerned. It is therefore a simple matter to make high-level security services available and to obtain the benefit of the capabilities of the security servers via a service that they cannot offer individually.

Moreover, the virtual server manages the physical location of the various security servers and the corresponding access means: direct access or access via a software bus, for example.

Finally, applications do not need to know anything about security servers other than the virtual server V. Consequently, they do not need to know anything about the negotiation protocols employed, and ill-intentioned attacks on the system are inevitably made more difficult.

In an embodiment of the invention, the software applications can access the functions of the virtual server via a programming interface or an API (application programming interface).

In a particular embodiment of the invention, the virtual security server is written in a programming language such as Java to make it independent of the underlying operating system. The virtual security server is then able to function on any type of operating system provided that a Java virtual machine is inserted between the operating system and the server.

The invention claimed is:

1. A computer-implemented virtual security server enabling a plurality of software applications to access a plurality of security services providing secure communication between said software applications, the computer-implemented virtual security server comprising:
   receiving means for receiving requests for said security services from said software applications,
   communications means for communicating with a plurality of security servers each providing a different security service, and
   selection means for determining which of said security servers can provide a security service based on contents of a first request for said security service received by said receiving means, and for sending to a selected security server, according to a negotiation protocol utilized by said selected security server and via said communications means, a second request enabling said selected security server to provide said security service corresponding to said first request for said security service to said software application, said second request including at least a portion of data being contained in said first request for said security service, wherein at least two of said security servers utilize different negotiation protocols for providing different security services.

2. A system according to claim 1, wherein said software applications access said virtual server via a programming interface or an application programming interface.

3. A system according to claim 1, wherein said computer-implemented virtual security server is written in a programming language.

4. A method of enabling a software application to access a plurality of security services providing secure communication for said software application, the method comprising:
   sending from said software application a first request for a security service to a virtual security server,
   at said virtual security server, selecting from a plurality of security servers each providing a different security service, a destination security server able to provide the security service based on contents of said first request, and
   sending a second request from said virtual security server to said destination security server according to a negotiation protocol utilized by said destination security server and so that said destination security server can provide said security service to said software application, said second request including at least a portion of data contained in said first request, wherein at least two of said security servers utilize different negotiation protocols for providing different security services.

5. A computer-implemented virtual security server enabling a plurality of software applications to access a plurality of security services providing secure communication between said software applications, the computer-implemented virtual security server comprising:

receiving means for receiving requests for said security services from said software applications using a first negotiation protocol, communications means for communicating with a plurality of security servers each providing a different security service, and selection means for determining which of said security servers can provide a security service based on a first request for said security service received by said receiving means, and for sending to a selected security server, via said communications means, a second request for said security service using a second negotiation protocol of said selected security server which is different than said first negotiation protocol, said second request including data enabling said selected security server to provide said security service corresponding to said first request to said software application, at least a portion of said data being contained in said first request for said security service.

6. A method of enabling a software application to access a plurality of security services providing secure communication for said software application, the method comprising:

sending from said software application a first request for a security service to a virtual security server using a first negotiation protocol, at said virtual security server, selecting from a plurality of security servers each a different security service, a destination security server able to provide the security service corresponding to said request, and sending a second request for said security service from said virtual security to said destination security server using a second negotiation protocol of said destination server which is different than said first negotiation protocol, said second request including data enabling said destination security server to provide said security service corresponding to said first request to said software application, at least a portion of said data being contained in said first request.

* * * * *